United States Patent [19]

Nakayama et al.

[11] Patent Number: 5,445,691
[45] Date of Patent: Aug. 29, 1995

[54] PRECURE TREAD FOR TIRE INCLUDING SURFACE AND REAR GROOVES

[75] Inventors: Shohachiro Nakayama, Tachikawa; Toyomi Iwata, Sayama; Masahiro Kuroda, Higashimurayama; Naoyuki Goto; Hiroshi Ueda, both of Kodaira; Michio Ishii, Higashimurayama, all of Japan

[73] Assignee: Bridgestone Corporation, Tokyo, Japan

[21] Appl. No.: 120,544

[22] Filed: Sep. 14, 1993

Related U.S. Application Data

[62] Division of Ser. No. 329,476, Mar. 28, 1989, Pat. No. 5,275,218.

[30] Foreign Application Priority Data

Mar. 29, 1988 [JP] Japan ................... 63-77548
Feb. 9, 1989 [JP] Japan ................... 1-28678

[51] Int. Cl.⁶ .................................. B60C 11/00
[52] U.S. Cl. ........................ 152/209 R; 156/96
[58] Field of Search ............. 152/209 R; 156/96, 87, 156/97, 128.1, 128.6, 130.3, 129, 127

[56] References Cited

U.S. PATENT DOCUMENTS

| | | | |
|---|---|---|---|
| 2,770,282 | 11/1956 | Herzegh | 156/87 |
| 2,960,138 | 11/1960 | Chiodo | |
| 2,966,936 | 1/1961 | Schelkmann | 156/96 |
| 3,115,919 | 12/1963 | Roberts | |
| 3,455,753 | 7/1969 | Schelkmann | |
| 4,230,511 | 10/1980 | Olsen | 156/96 |
| 4,664,166 | 5/1987 | Benisti | |
| 4,934,426 | 6/1990 | Remond | 156/96 |

FOREIGN PATENT DOCUMENTS

| | | | |
|---|---|---|---|
| 6386480 | 5/1981 | Australia . | |
| 99817 | 7/1983 | European Pat. Off. . | |
| 0159537 | 5/1988 | European Pat. Off. . | |
| 2647514 | 4/1978 | Germany | 156/87 |
| 47-13921 | 4/1972 | Japan . | |
| 51-95902 | 7/1976 | Japan . | |
| 95902 | 7/1976 | Japan | 156/96 |
| 55-160606 | 12/1980 | Japan . | |
| 58-134728 | 8/1983 | Japan . | |
| 58-50882 | 11/1983 | Japan . | |
| 830933 | 3/1960 | United Kingdom . | |

*Primary Examiner*—Geoffrey L. Knable
*Attorney, Agent, or Firm*—Sughrue, Mion, Zinn, Macpeak & Seas

[57] ABSTRACT

A precure tread for a tire has surface grooves facing a tread face, rear grooves facing a crown portion of a base tire, and a passage for communication between the grooves to atmosphere. The groove bottom of the rear grooves is located at a high level than a groove bottom of the surface groove in the radial direction. The tire durability can be considerably improved when this precure tread is applied to a new tire or a retreated tire.

5 Claims, 9 Drawing Sheets

FIG_1

FIG_2

FIG_3

FIG_4

FIG_5

FIG_8

FIG_9

FIG_10

FIG. 14

FIG_15

FIG_16

FIG_17a    FIG_17c    FIG_17e

FIG_17b    FIG_17d

FIG_18a     FIG_18b

PRECURE TREAD FOR TIRE INCLUDING SURFACE AND REAR GROOVES

This is a divisional of application Ser. No. 07/329,476 filed Mar. 28, 1989 now U.S. Pat. No. 5,275,218.

BACKGROUND OF THE INVENTION

1. Field of the Invention

This invention relates to a precure tread for tire, pneumatic tires using the same and a method of producing such a pneumatic tire. Particularly, the invention provides a considerable improvement of tread durability when this precure tread is applied to, for example, a new or retreaded tire for truck and bus.

2. Related Art Statement

Figure 19:
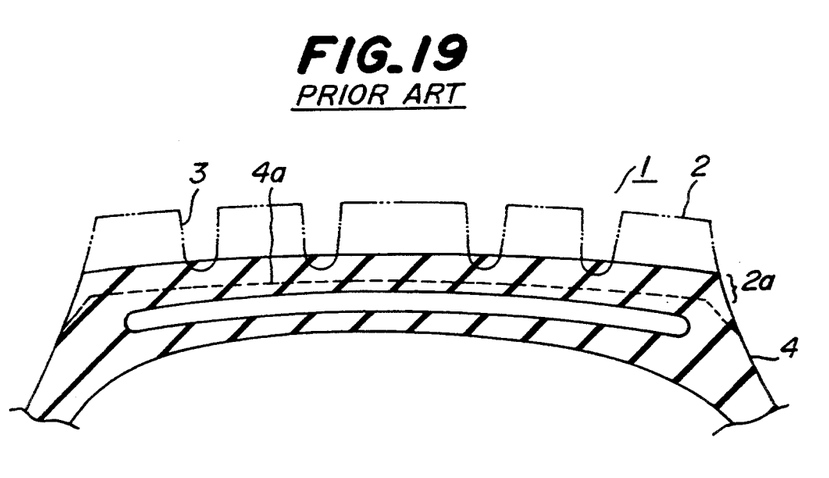
FIG. 19 is a sectional view in widthwise direction of a tire to be retreaded.

In tires, such as pneumatic tire for truck and bus and the like, as the running distance increases, a tread 2 of a tire 1 is gradually worn as shown in FIG. 19 to shallow circumferential main grooves 3 formed on the surface of the tread 2, whereby the road gripping force of the tread 2 as well as the wet performances of the tire greatly lower. Therefore, the tire 1 is generally and frequently retreaded at a state that the main groove 3 is left to a certain extent in the tread 2.

Figure 20:
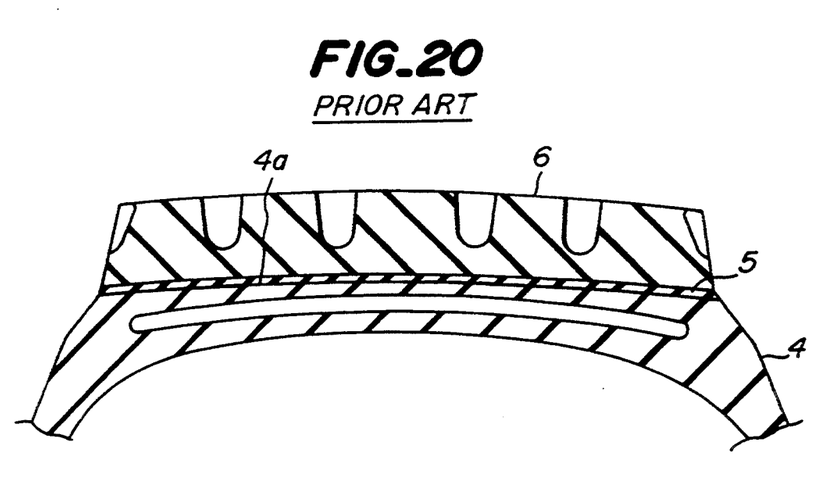
FIG. 20 is a sectional view in widthwise direction of the conventional retreaded tire.

The retreading of the tire is usually carried out by buffing the remaining tread portion 2a of the worn tire 1 to form a base tire 4 as shown, for example, by dotted lines in FIG. 19, and then bonding a precure tread 6 to a crown portion 4a of the base tire 4 through a cushion rubber 5 by vulcanization as shown in FIG. 20.

Moreover, the retreading of the tire is repeated 2 to 3 times or may be repeated more than 3 times though it changes in accordance with the service conditions. In case of repeating the retreading, if the wear resistance of the tread is low or the wet performances and the like at last worn stage are low, the period between the retreading and next retreading becomes shorter and the retreading becomes uneconomical.

In order to sufficiently develop the wet performances and other performances of the tread even at the last worn stage, there is proposed a tire as described in Japanese Utility Model laid open No. 51-95,902.

Figure 21:
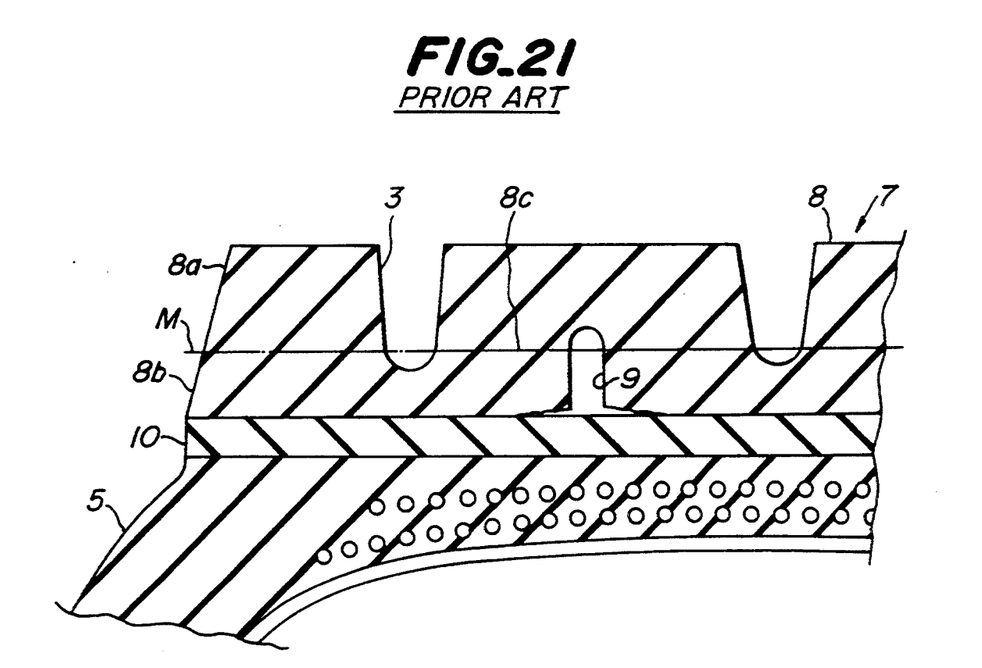
FIG. 21 is a sectional view in widthwise direction of another conventional tire.

In this proposed tire, a rear groove extending from a position separated outward from the bottom of the surface groove in the radial direction toward the inside in the radial direction is continuously or discontinuously disposed in the inside of the tread in the circumferential direction of the tire. In this tire, the rear groove is exposed at the last worn stage, whereby the degradation of the wet performances and other performances can effectively be prevented. That is, when this proposal is applied to a precure tread 8 of a retreaded tire 7 as shown in FIG. 21, the precure tread 8 comprises plural main grooves 3 at its ground contacting portion 8a and a rear groove 9 at its rear portion 8b facing the base tire. When the tread 8 is worn up to a position shown by dot-dash lines M in FIG. 21 during the use of the retreaded tire 7, the rear groove 9 appears at a tread face 8c, and consequently the drainage effect through the rear groove 9 as well as the edge effect at the groove edge of the rear groove are generated to largely improve the wet performances.

Furthermore, the precure tread 8 is designed to provide sufficient wet performances at the last worn stage, so that it is useless to ensure extra wet performances in the precured tread over a period ranging from initial worn stage to last worn stage. As a result, a ratio of surface groove area occupied in ground contacting area of the tread or so-called negative ratio can be made small to improve the wear resistance and resistance to uneven wear.

In the tire of FIG. 21, however, the rear groove 9 forms a closed space through the bonding of the precure tread 8 to the cushion rubber 10, so that gas existing in the rear groove 9 thermally expands through compressive deformation of the tread 8 repeated during the running of the tire and gets into an interface between the tread 8 and the cushion rubber 10 due to the increase of the volume of the gas itself. As a result, there is a problem of peeling a portion of the tread 8 near the rear groove 9 from the cushion rubber 10 as exaggeratedly shown in FIG. 21 to degrade the durability of the tire.

SUMMARY OF THE INVENTION

It is, therefore, an object of the invention to advantageously solve the above problems of the conventional technique and to provide a precure tread for a tire capable of considerably improving the durability of the tread and hence the tire by sufficiently preventing the peeling of the tread due to the presence of the rear groove, a pneumatic tire using the same, and a method of producing such a pneumatic tire.

According to a first aspect of the invention, there is the provision of a precure tread for a tire to be bonded to a crown portion of a base tire and having a ground contacting portion located at a tread side of the tire and a rear portion located at the side of the base tire in which plural surface grooves are formed in the ground contacting portion and plural rear grooves are formed in the rear portion. A groove bottom of the rear groove is located at a level higher than a groove bottom of the surface groove in the radial direction of the tire. Each of the rear grooves communicates to an atmosphere at the side of said ground contacting portion through a passage formed in said precured tread.

According to a second aspect of the invention, there is the provision of a pneumatic tire obtained by integrally bonding a base tire to a precure tread for a tire having a ground contacting portion located at a tread side of the tire and a rear portion located at the side of the base tire. Plural surface grooves are formed in the ground contacting portion and plural rear grooves are formed in the rear portion, through an adhesive or an unvulcanized cushion rubber. A groove bottom of the rear groove is located at a level higher than a groove bottom of the surface groove in the radial direction of the tire. Each of the rear grooves communicates to an atmosphere at the side of said ground contacting portion through a passage formed in said precure tread.

The term "precure tread" used herein means a tread formed in a mold and vulcanized therein. The rear groove may be continuously or discontinuously formed in the circumferential direction of the tire, while the sectional shape of the passage may be circle of venthole-like, rectangle of sipe-like, and other required shape.

According to a third aspect of the invention, there is the provision of a method of producing a pneumatic tire as defined in the second invention, comprising attaching a precure tread having a ground contacting portion located at a tread side of the tire and a rear portion located at a side of a base tire. Plural surface grooves are formed in the ground contacting portion and plural rear grooves are formed in the rear portion, to a crown portion of a base tire through an unvulcanized cushion rubber, mounting the resulting assembly onto a rim together with an envelop housing the assembly therein, and then vulcanizing the assembly by heating under a pressure. The rear grooves communicate to an atmosphere through a passage formed in the precure tread. A wick contacts with the outer peripheral surface of the precure tread and a guide pipe contacts with the wick.

In a precure tread according to a fourth aspect of the invention, the groove bottom of the rear groove is located at a level higher than the groove bottom of the surface groove, and an opening portion extending to the surface of the tread is formed in the precure tread above the rear groove and separated from the rear groove through a partition wall. In a precure tread according to a fifth aspect of the invention, the groove bottom of the rear groove is located at a level higher than the groove bottom of the surface groove, and an opening portion of the rear groove extending above the rear groove is formed in the precure tread and terminated in a protrusion formed on the surface of the tread surface.

According to a sixth aspect of the invention, there is the provision of a method of producing a pneumatic tire, comprising the steps of:
(a) attaching a precure tread having a ground contacting portion located at a tread side of the tire and a rear portion located at a side of a base tire, in which plural surface grooves are formed in the ground contacting portion and plural rear grooves are formed in the rear portion, to a crown portion of a base tire through an unvulcanized cushion rubber;
(b) mounting the resulting assembly onto a rim together with an envelop housing the assembly therein;
(c) vulcanizing the assembly by heating under a pressure; and
(d) communicating said rear groove to an atmosphere after the vulcanization.

BRIEF DESCRIPTION OF THE DRAWINGS

The invention will be described with reference to the accompanying drawings, wherein:

FIGS. 1 to 3 show a first embodiment of the precure tread according to the first aspect of this invention and the pneumatic tire using the same, wherein

FIGS. 6 to 13 show second to fifth embodiments of the precure tread according to the invention, wherein

DESCRIPTION OF THE PREFERRED EMBODIMENTS

When the first precure tread according to the invention is applied to a new tire or a retreaded tire, the rear groove is exposed before the disappearance of the surface groove with the advance of tread wearing. That is, the groove as expected is existent in the tread over a period ranging from the initial worn stage to the last worn stage, so that there is no fear of lowering the drainage and wet performances of the tire even when the tread is worn up to the rear groove. Consequently the wear life of the tread is considerably prolonged.

In this case, the surface groove can be arranged in the precure tread without particularly considering the wet performances of the tread at the last worn stage. That is, it is sufficient to consider only the wet performances ranging from the initial worn stage of the tread to the last worn stage thereof, so that the wear resistance of the tread can largely be improved by effectively reducing the ratio of surface grooves occupied in the tread surface.

In case of tires using the above precure tread, since the rear groove communicates to atmosphere through the passage formed in the precure tread, gas inside the rear groove is freely moved toward the atmosphere, so that even when heat is generated in the tread due to compression deformation of the tread during the running, there is no peeling of the tread resulted from thermal expansion of gas inside the rear groove. Further, the tread is effectively cooled by air flowing in or out in the rear groove, so that the thermal fatigue of the tread and cushion rubber can sufficiently be controlled.

In the first method according to the invention, when the precure tread is bonded by vulcanization to the crown portion of the base tire through the unvulcanized cushion rubber, the rear groove of the precure tread communicates to atmosphere through the passage formed in the precure tread, the wick contacting with the outer peripheral surface of .the precure tread and the guide pipe contacting with the wick. Thus, air sandwiched between the precure tread and the unvulcanized cushion rubber, gas produced by the reaction of the unvulcanized cushion rubber and the like are smoothly discharged into the atmosphere, so that the adhesion force between the cushion rubber and the tread is considerably increased to largely improve the durability of the tire.

In the second and third precure treads according to the invention, the communication of the rear groove to the atmosphere is obstructed by the partition wall or the protrusion formed on the tread surface. In this case, however, the rear groove can communicated very simply to atmosphere at the side of the ground contacting portion of the precure tread by piercing a hole in the partition wall with the opening portion facing the tread surface as a mark or cutting out the protrusion from the precure tread at as-precured tread state or after the bonding to the base tire.

Moreover, the partition wall or the protrusion in such a precure tread can be removed in accordance with the wearing of the tread when the precure tread is bonded to the base tire and then mounted onto a vehicle and run over a given distance.

In the second method for the manufacture of the tire according to the invention, the vulcanization is carried out by using the above second and third precure treads and then the rear groove communicates to atmosphere by the piercing of the partition wall or the removal of the protrusion after the vulcanization. Thus the peeling of tread resulting from thermal expansion of gas in the rear groove can be prevented very effectively.

In case of applying the second precure tread, the given piercing position can be simply and rapidly found owing to the presence of the opening portion facing the tread surface. In case of applying the third precure tread, all protrusions are cut out by means of a cutters or the like, so that the rear groove can be communicated to atmosphere very simply and rapidly at small operating steps as mentioned above.

Figure 1:
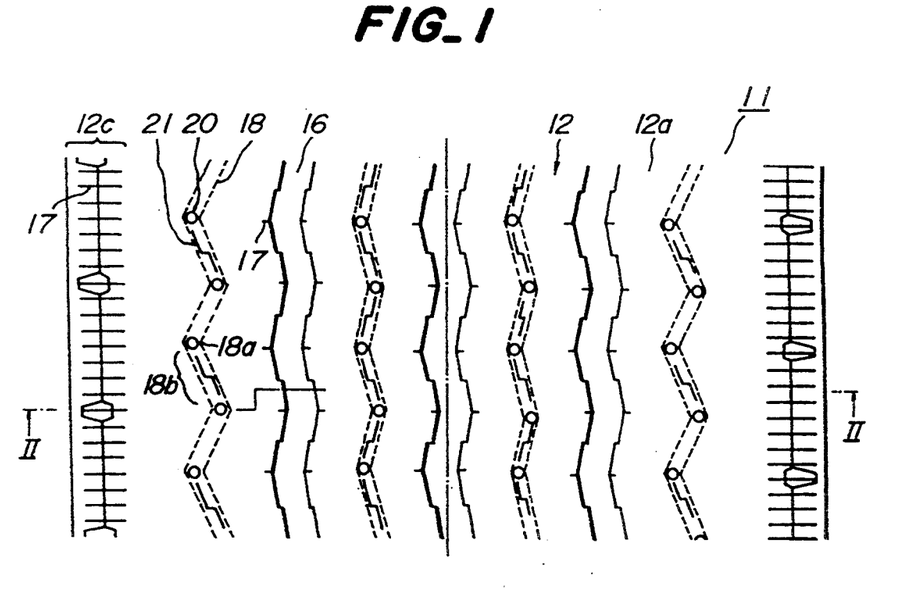
FIG. 1 is a partly plan view of the tire.
Figure 2:
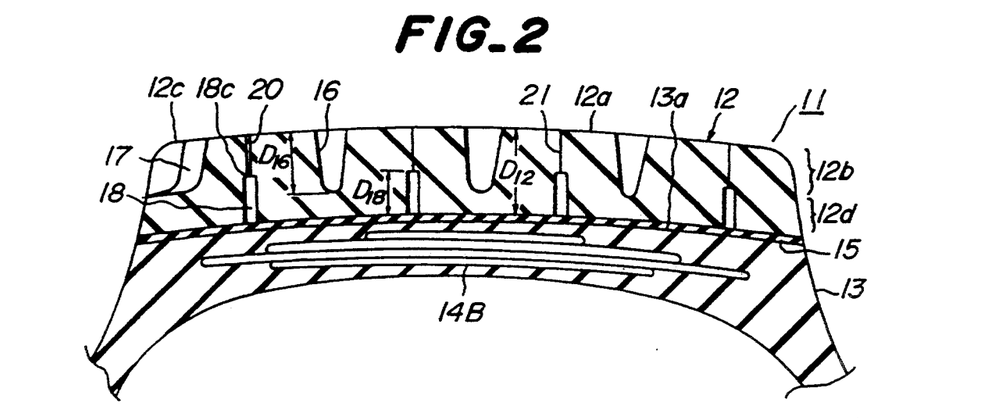
FIG. 2 is a sectional view taken along a line II—II of FIG. 1.
Figure 3:
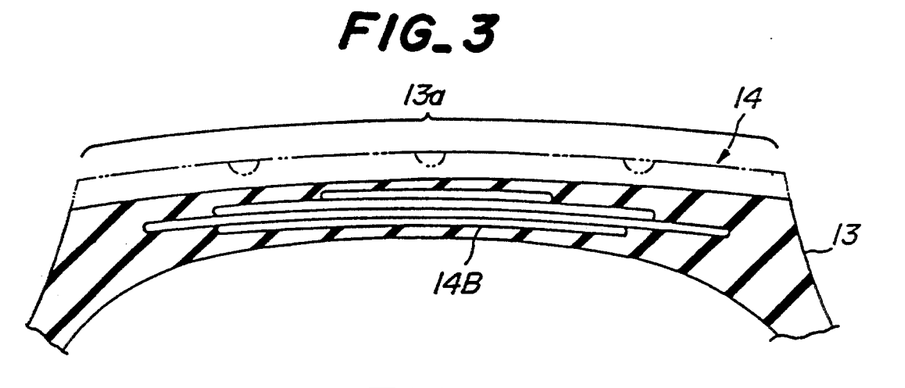
FIG. 3 is a partly sectional view in widthwise direction of the base tire used in the manufacture of the retreaded tire of FIG. 1.

FIGS. 1 to 3 illustrated the first precure tread according to the invention and a first embodiment of the pneumatic tire using the same.

The construction of such a tire will be described below.

In FIGS. 1 and 2, numeral 11 is a a retreaded tire for truck and bus, and numeral 12 a precure tread applied for the retreaded tire 11. This precure tread 12 is composed of a vulcanized rubber member and integrally united with a base tire 13 by bonding to a crown portion 13a of the base tire 13, which is obtained by buffing a tread 14 of a used tire shown by a phantom line in FIG. 3 to solid line position, through a sheet-like cushion rubber 15 by vulcanization.

In FIGS. 2 and 3, numeral 14B is a belt.

As shown in FIGS. 1 and 2, the precure tread 12 is provided at a ground contacting portion 12b facing a side of a tread face 12a with three main grooves 16 as a surface groove extending zigzag in the circumferential direction of the tire. These main grooves 16 are designed to improve the wear resistance by reducing the groove area in view of the consideration of only the wet performance over a period from the initial worn stage to the last worn stage.

Numeral 17 is a sipe, which is obtained by arranging a short sipe in a shoulder portion 12c of the precure tread 12 and both side edge portions of the main groove 16 in the widthwise direction of the tire.

Numeral 18 is a rear groove. In the precure tread 12, four rear grooves 18 are formed in a rear portion 12d of the precure tread 12 facing the base tire 13 between the main grooves 16 and between the main groove 16 and the shoulder portion 12c. Each of the rear grooves 18 directed from the side of the base tire 13 to the side of the tread face 12a and continuously extends zigzag in the circumferential direction of the tire.

Moreover, the main groove 16 is substantially U-shaped in section and has preferably a relation of $D_{12}=D_{16}+(3\sim4 \text{ mm})$, wherein $D_{16}$ is a depth of the main groove 16 and $D_{12}$ is a thickness of the precure tread 12. On the other hand, the rear groove is also substantially U-shaped in section and has a relation of $D_{18}=D_{16}\times 0.4$ $(3\sim4 \text{ mm})$, wherein $D_{18}$ is a depth of the rear groove 18. That is, the main groove 16 and the rear groove 18 are exposed to atmosphere together when the precure tread 12 is worn to a given extent.

When the retreaded tire 11 using such a precure tread 12 is mounted onto a truck or bus and actually run, as the running distance increases, the precure tread 12 of the retreaded tire 11 is worn from the side of the tread face 12a to gradually make the depth of the main groove 16 shallow. When the worn quantity of the precure tread 12 reaches about 60% of the thickness $D_{16}$, the rear grooves 18 appear. In other words, the rear groove is exposed before the complete disappearance of the main groove 16, so that both the main groove 16 and the rear groove 18 contribute to the improvement of the wet performances. Therefore, the retreaded tire 11 using this precure tread 12 can sufficiently develop the drainage and wet performances on wet road surface even at the last worn stage of the tread. Furthermore, the retreaded tire can be used until the rear groove disappears, so that the wear life of the tire can largely be prolonged.

Figure 4:
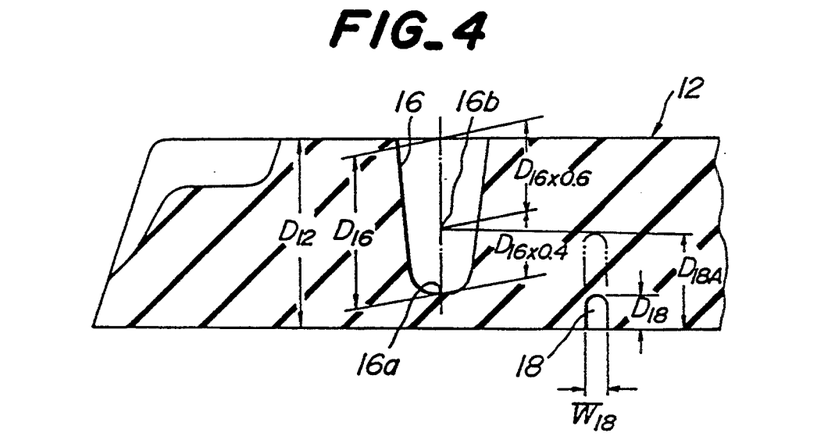
FIGS. 4 and 5 are partly sectional views showing a main part of the precure tread for tire according to the invention, respectively.

For this end, the depth $D_{18}$ of the rear groove 18 should exceed over a position corresponding to the groove bottom 16a ($D_{16}$) of the main groove 16 as shown in FIG. 4. Preferably, the rear groove 18 has a depth $D_{18A}$ corresponding to a point 16b 0.4 times of the depth $D_{16}$ of the main groove 16. Further, the groove width $W_{18}$ of the rear groove 18 should preferably be not less than 1 mm.

Figure 5:
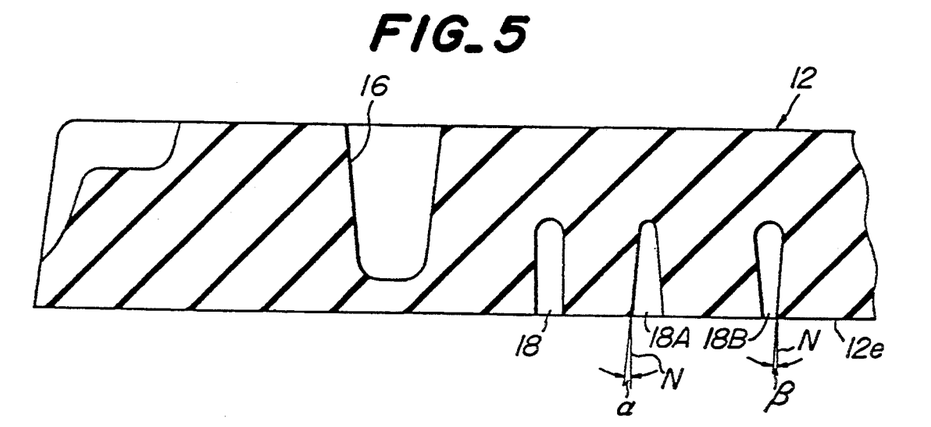

According to the invention, the sectional form of the rear groove 18 is not restricted to only the U-shaped form. For example, as shown in FIG. 5, a rear groove 18A has a V-shaped form in section in which the groove wall has an angle $\alpha$ with respect to a line segment N perpendicular to the rear face 12e of the precure tread 12. A rear groove 18B having a teardrop-like form in section in which the groove wall is inclined at an angle $\beta$ with respect to the line segment N in an opposite direction to the case of the rear groove 18A, and the like.

In FIGS. 1 and 2, numerals 20 and 21 are a venthole and sipe respectively formed in the precure tread 12 as a passage for communicating the rear groove to the atmosphere, respectively. The venthole 20 is arranged in each folded portion 18a of the rear groove 18 and preferably has a diameter of not less than 0.5 mm. Moreover, the number of ventholes is preferably not less than 5 on the circumference when the rear groove 18 continuously extends in the circumferential direction. When the rear groove 18 is discontinuously extended in the circumferential direction, 5 or more ventholes are arranged in each of the discontinued groove portions.

The sipe 21 arranged in the straight portion 18b of the rear groove 18 preferably has an opening width of not less than 0.5 mm and a length of not less than 3.0 mm along the rear groove 18.

Further, the number of sipes is preferably not less than 5 on the circumference when the rear groove 18 continuously extends in the circumferential direction. When the rear groove 18 is discontinuously extended in the circumferential direction, 5 or more sipes are arranged in each of the discontinued groove portions.

Since the rear groove 18 always communicates to atmosphere at the side of the ground contacting portion through these ventholes and sipes, when the retreaded tire 11 using the precure tread 12 is mounted onto a truck or bus and actually run, even if the gas inside the rear groove 18 is thermally expanded by heat generated from rubber around the rear groove 18 due to the compression deformation of the tread during running, such gas is discharged toward the outside through the venthole 20 and/or the sipe 21. Thus the penetration of the expanded gas between the tread 12 and the cushion rubber 15 and hence the peeling of the tread 12 from the cushion rubber 15 are prevented very effectively. At the same time, cooled air flows from the outside into the rear groove 18 through the venthole and/or sipe to cool the groove walls of the rear groove 18 and the cushion rubber 15, so that the thermal fatigue of the tread 12 and the cushion rubber 15 is sufficiently restrained.

The second embodiment of the invention will be described below.

Figure 6:
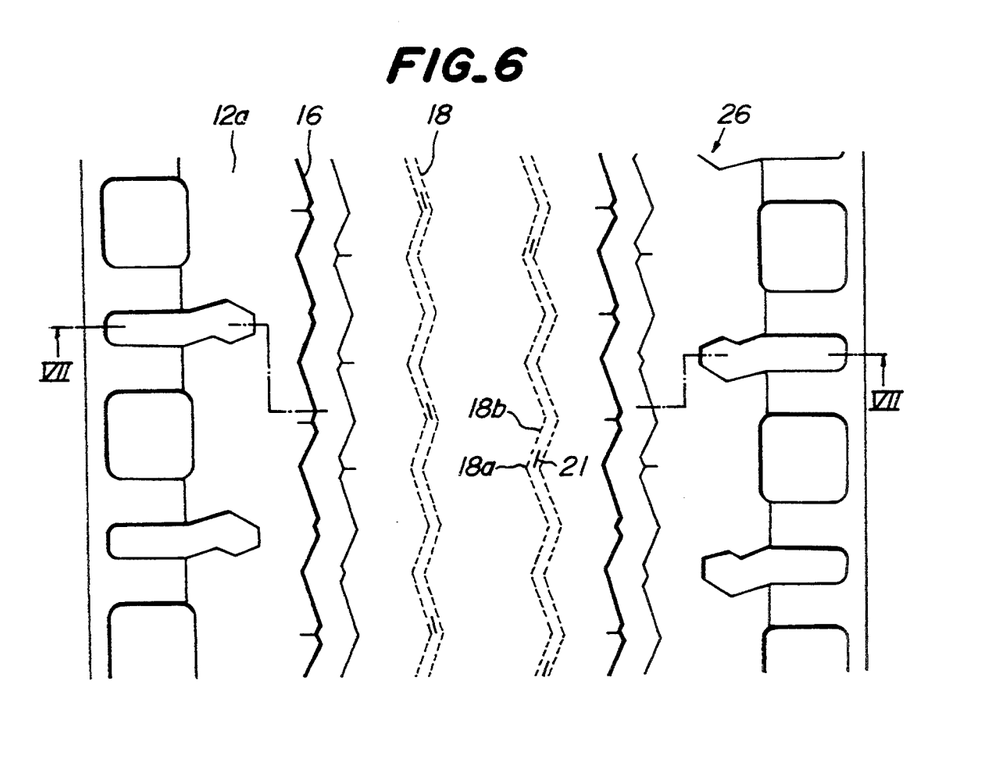
FIG. 6 is a partly plan view of the second embodiment.
Figure 7:
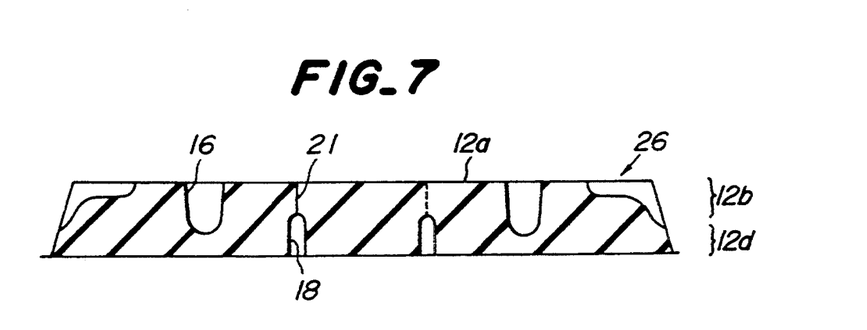
FIG. 7 is a sectional view taken along a line VII—VII of FIG. 6.

FIGS. 6 and 7 show the second embodiment of the precure tread according to the invention, wherein the same element as in the first embodiment is represented by the same numeral. In this precure tread 26, two main grooves 16 are arranged in the tread face 12a to continuously extend zigzag in the circumferential direction of the tread, and two rear grooves 18 are arranged between main grooves 16 and in the central part of the rear portion 12d to continuously extend in a zigzag in the circumferential direction. Further, only the sipe 21 is arranged in the precure tread 26 over a region ranging from a middle position of the straight portion 18b of the rear groove 18 toward the folded portion 18a thereof.

The third to fifth embodiments of the invention will be described below. The same parts as in the first embodiment are represented by the same numeral.

Figure 8:
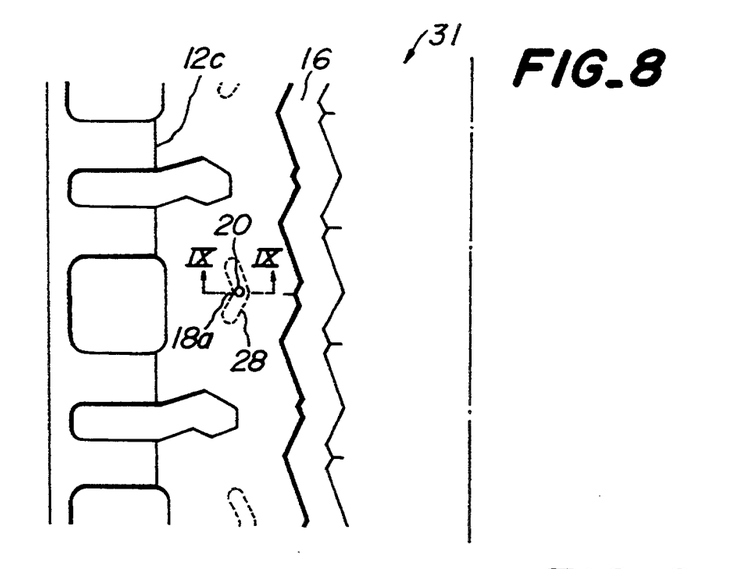
FIG. 8 is a partly plan view of the third embodiment.
Figure 9:
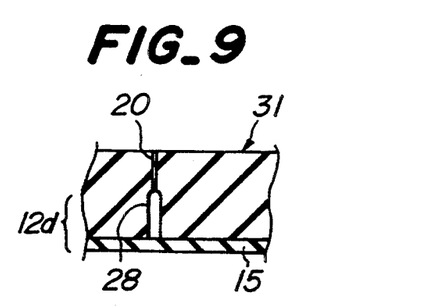
FIG. 9 is a sectional view taken along a line IX—IX of FIG. 8.

FIGS. 8 and 9 show the third embodiment of the precure tread according to the invention.

In this precure tread 31, many folded rear grooves 28 discontinuously extending in the circumferential direction are arranged in the rear portion 12d of the precure tread between the tread shoulder portion 12c and the main groove 16 adjoining thereto. The venthole 20 is arranged in the precure tread at each folded portion of the rear grooves 28.

Figure 10:
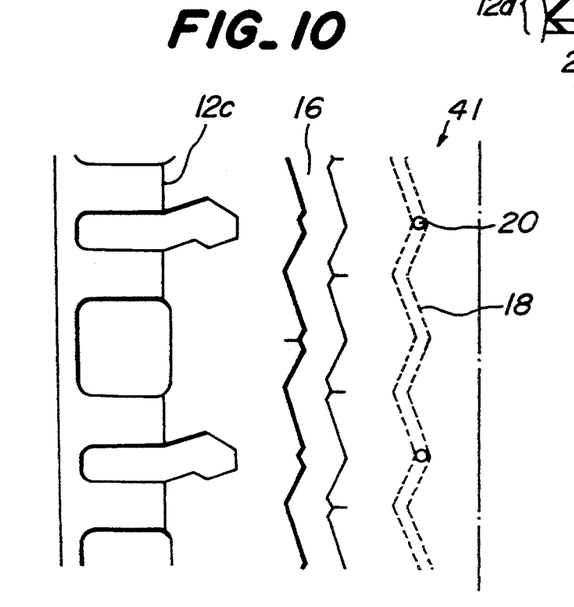
FIG. 10 is a partly plan view of the fourth embodiment.

FIG. 10 shows a fourth embodiment of the precure tread according to the invention.

In this precure tread 41, a rear groove 18 continuously extending in a zigzag in the circumferential direction is arranged in the rear portion 12d located at the central portion of the precure tread. The venthole 20 is arranged in the precure tread at the folded portion 18a of the rear groove 18.

Figure 11:
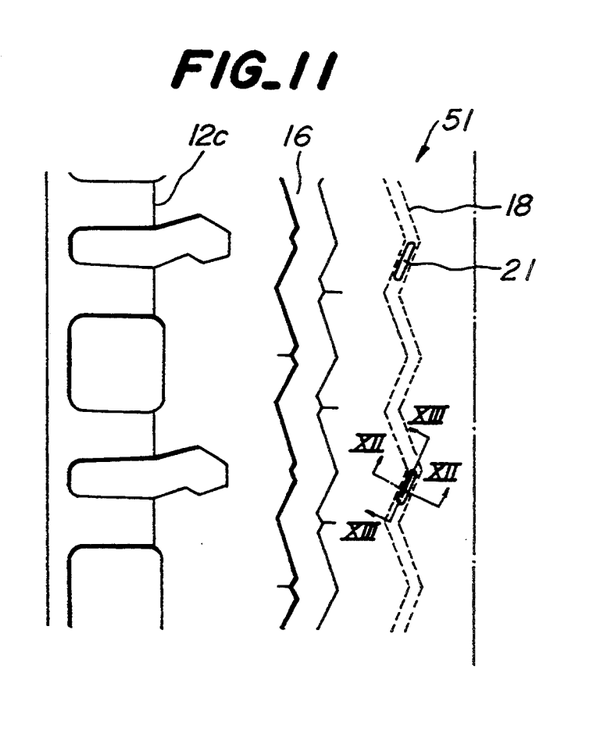
FIG. 11 is a partly plan view of the fifth embodiment.
Figure 12:
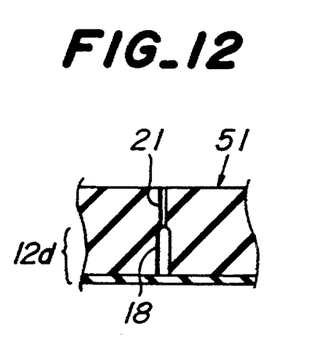
FIGS. 12 and 13 are sectional views taken along lines XII-XII and XIII—XIII of FIG. 11, respectively.
Figure 13:
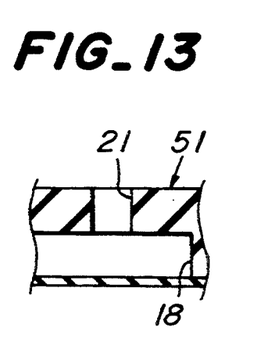

FIGS. 11 to 13 show a fifth embodiment of the precure tread according to the invention.

In this precure tread 51, a rear groove 18 continuously extending in a zigzag in the circumferential direction is arranged in the rear portion 12d located at the central portion of the precure tread. A wide sipe 21 is arranged in the precure tread at the straight portion 18b of the rear groove 18.

In order to confirm the effect of the aforementioned precure treads according to the invention, there were provided three test tires (tire I~III) and then the durability test was made with respect to these tires. The durability test will be described below.

The test tire I is the first embodiment, wherein only 4 ventholes each having a diameter of 2 mm are arranged on the circumference for communicating each of the rear grooves to the atmosphere. The test tire II is a modified example of the test tire I, wherein 12 ventholes are arranged on the circumference. Further, the test tire III is also a modified example of the test I, wherein only 5 ventholes are arranged on the circumference.

These test tires were subjected to a durability test by means of an in-door type drum testing machine under usual durability test conditions. As a result, the test tire I was broken at the running distance of 3304 km, and the test tire II was broken at the running distance of 5292 km, and the test tire II was broken at the running distance of 5180 km.

As seen from the above, the test tires II and III have substantially the same level in the durability, while in the test tire I, the effect of communication to the atmosphere is insufficient.

Further, when each of the test tires II and III is mounted onto a vehicle and actually run, the vehicle can normally be run even when the worn quantity of the tread is 75%~92%, whereby the wear life of the tire can largely be improved.

On the other hand, it have been confirmed that durability is further improved by enhancing the fatigue resistance of the cushion rubber.

As mentioned above, according to the invention, the wet performances on wet road surface can sufficiently be developed even at the last worn stage of the tread and also the wear life can largely be improved without damaging the wet performances.

Moreover, the groove area of the surface grooves can be reduced over a period reaching the last worn stage, whereby the substantial ground contacting area of the tread can be increased to realize the improvement of the wear resistance of the tread.

Figure 14:
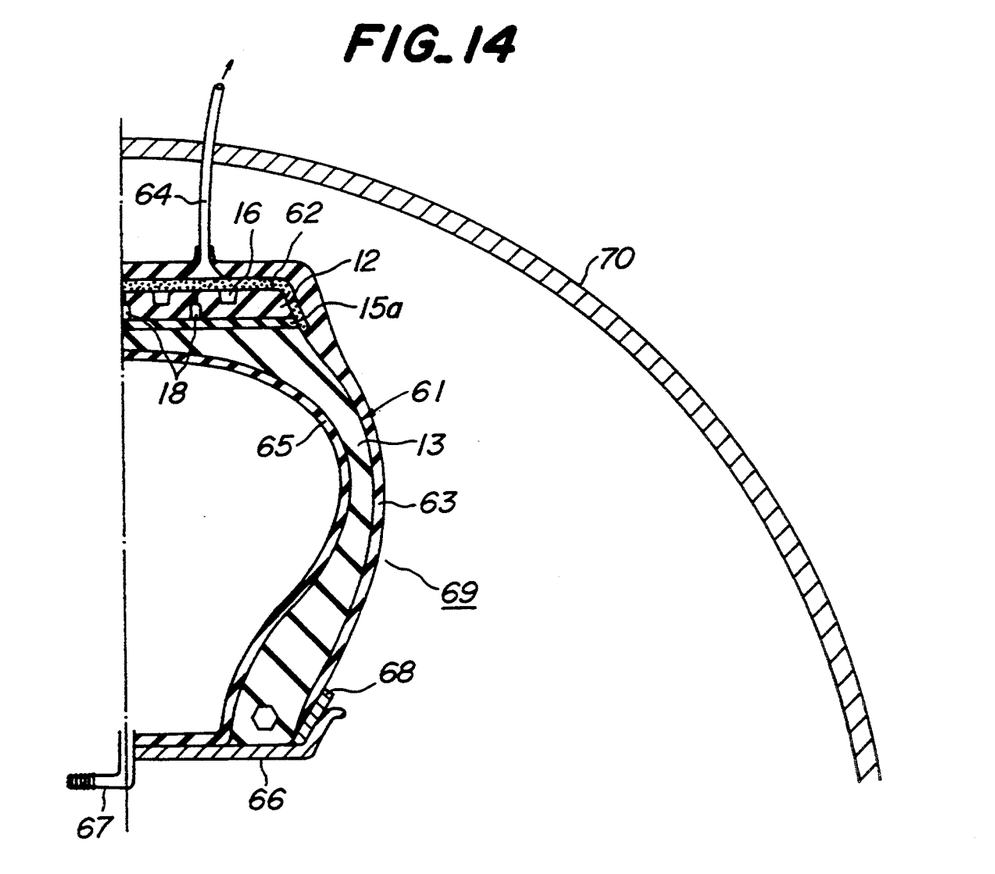
FIG. 14 is a sectional view illustrating a method for the production of tire using the precure tread for tire according to the first aspect of this invention.

FIG. 14 is a sectional view illustrating a first method for the manufacture of tires according to the invention using the above first embodiment of the precure tread for tire. According to this method, air sandwiched between the precure tread 12 and unvulcanized cushion rubber when the precure tread 12 is attached to the outer peripheral surface of the unvulcanized cushion rubber, and reaction gas produced from the cushion rubber when the precure tread 12 is bonded to the base tire 13 by vulcanization are sufficiently discharged from the rear grooves 18. Thus the adhesion force of the precure tread 12 to the cushion rubber 15 and hence the tire durability can be improved.

In the first method, the precure tread 12 is first attached to the crown portion 13a of the base tire 13 through the unvulcanized cushion rubber 15a to form an attached assembly 61. Then, a wick 62 extending in the widthwise direction of the assembly 61 and arriving inward in the radial direction over the arranged position of the unvulcanized cushion rubber 15a is attached to at least one portion of the assembly 61 on the outer periphery thereof, while a protection liner (not shown) is attached to the remaining portion of the outer periphery of the assembly 61 other than the position of the wick 62. Next, the assembly 61, the wick 62 and the protection liner are enveloped with an envelop 63 to contact a top of a guide pipe 64 attached to the envelop 63 with the outer periphery of the wick 62. Thereafter, the assembly 61 is lined with an inner tube 65 and mounted into a rim 66 together with the envelop 63. Then, pressurized air of, for example, about 8 kg/cm² is supplied to the inside of the inner tube 65 through a valve 67.

In this case, the attachment of the inner end portion of the envelop 63 in the radial direction to the rim can be carried out by sandwiching another flange member 68 between the envelop and the rim flange to airtightly seal the envelop 63 and the assembly 61, whereby the introduction of air or other gas therebetween can sufficiently be prevented.

After the resulting rimmed structure 69 is placed in a vulcanizer 70, the other end portion of the guide pipe 64 is led from the vulcanizer 70 to the outside thereof and then the vulcanizer 70 is closed. Thereafter, the assembly 61 is vulcanized by supplying a heated pressurized fluid to the inside of the vulcanizer 70. Such vulcanization can be carried out at a temperature inside the vulcanizer of about 130° C., for example, by supplying steam to the inside of the vulcanizer under a pressure of about 2 kg/cm² and further feeding air until the inner pressure of the vulcanizer reaches about 6 kg/cm².

When the precure tread 12 is bonded by vulcanization to the base tire 13 as mentioned above, air sandwiched between the assembly 61 and the envelop 63 moves toward the wick 62 under an influence of the pressure applied to the envelop 63. It then is discharged to the atmosphere outside the vulcanizer 70 through the guide pipe 64 contacting at its top with the wick 62, while air sandwiched between the unvulcanized cushion rubber 15a and the precure tread 12, reaction gas produced from the cushion rubber and the like mainly arrived at the wick 62 arranged on at least one portion of the assembly 61 in the circumferential direction and contacted with the tread 12 through the rear grooves 18, ventholes 20 and/or sipes 21 and then discharged to the atmosphere through the guide pipe 64.

In this way, the inner pressure of the rear groove is always maintained at a pressure equal to an atmospheric pressure. Therefore, the poor adhesion between the precure tread 12 and the cushion rubber 15 due to the fact that air, gas and the like remain in the rear grooves under a pressure higher than the atmospheric pressure is completely eliminated and the sufficiently strong adhesion can be realized.

When the precure tread 12 is bonded by vulcanization as mentioned above, it is preferable that in order to prevent the introduction of the cushion rubber into the rear groove during the vulcanization, the groove width of the rear groove 18 is 2~5 mm, and the inner pressure of the vulcanizer is within a range of 2~6 kg/cm², and the cushion rubber has a Mooney viscosity of not less than 40 when it is preheated for 1 minute and cured at 130° C. for 4 minutes. Thus, there can advantageously be prevented the lowering of the drainage performance at the last worn stage due to the fact that the lower end portion of the rear groove or an inward portion of the rear groove in the radial direction of the tire is buried with the cushion rubber 15, and the occurrence of cracking in the cushion rubber due to the fact that the cushion rubber complicated flows.

In the manufacture of tires according to the first method, there may be a fear that the main groove 16 is thermally deformed in connection with the size and form of the main groove 16. In this case, after a given time since the beginning of the vulcanization, air is supplied into the main groove through the guide pipe 64 under a pressure lower than the inner pressure of the vulcanizer, for example, a pressure of about 5 kg/cm², whereby the thermal deformation of the main groove 16 can sufficiently be removed without exerting on the adhesion force between the precure tread 12 and the cushion rubber 15.

The comparison test for durability and tread adhesion force will now be described with respect to a tire manufactured according to the first method of the invention and a tire manufactured without communicating the rear groove to the atmosphere.
Test tires:
a) Invention tire Each of the rear grooves is opened to the tread face of the tire through 12 ventholes having a diameter of 2 mm.
b) Comparative tire
All ventholes are omitted from the invention tire.
Test method:

As to the tire durability, the drum test was carried out with respect to the test tire to measure the running distance until the occurrence of the peeling between belt layers or the peeling at the retreaded interface. As to tread adhesion force, the peeling resistant force between tread and cushion rubber per a width of 1 inch was measured by means of a tensile testing machine.
Test results:

The results are shown in the following Table 1 by an index on the basis that the comparative tire is 100. The larger the index value, the better the property.

TABLE 1

|  | Comparative tire | Invention tire |
| --- | --- | --- |
| Tire durability | 100 | 300 |
| Tread adhesion force | 100 | 120 |

As seen from the above results, both tire durability and tread adhesion force can largely be improved according to the first method of the invention.

According to the first method of the invention, when the precure tread 12 is bonded by vulcanization to the base tire 13 through the cushion rubber, the rear groove communicates to atmosphere through the passage arranged in the precure tread 12, the wick 62 contacting with the precure tread 12 and the guide pipe 64 contacting with the wick 62 to discharge air, reaction gas and the like to the outside, whereby the tire durability can largely be improved while increasing the adhesion force of the tread 12.

Moreover, the rear grooves 18 are indirectly connected to the guide pipe 64 through the wick 62, so that undesirable gases exerting on the adhesion performance can completely and concentrically discharged through the single guide pipe 64.

Figure 15:
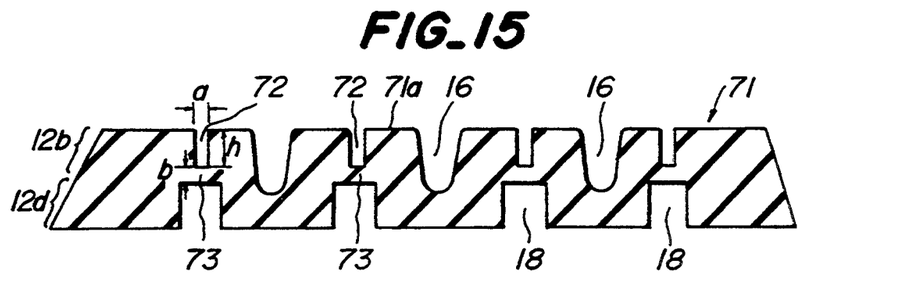
FIGS. 15 and 16 are sectional views in widthwise direction of the sixth and seventh precure treads, respectively.

FIG. 15 is a sectional view in widthwise direction of a sixth embodiment of the precure tread according to the invention.

In this precure tread 71, the main grooves 16 and the rear grooves 18 are arranged likewise the precure tread 12. At least one opening portion 72 opened to a tread face 71a is arranged above each of the rear grooves 18 and separated from the rear groove 18 through a partition wall 73. In this case, the opening portion 72 has a diameter $\underline{a}$ of 0.5~4.0 mm and a depth $\underline{h}$ of 0.5~8.0 mm, and the partition wall 73 has a thickness $\underline{b}$ of 0.5~6.0 mm. These valves of diameter, depth and thickness respectively can properly be selected within the above ranges, if necessary.

In the precure tread 71, the reason why the diameter $\underline{a}$ of the opening portion 72 is within a range of 0.5~4.0 mm, preferably 2.0~3.0 mm is based on the fact that the flowing of gas is sufficiently smoothened and the required rigidity of the island portions in the tread is ensured. The reason why the depth $\underline{h}$ of the opening portion 72 is within a range of 0.5~8.0 mm, preferably 1.0~2.0 mm is based on the fact that the durability of the mold pin is ensured and the deviation from center in the communication between the opening portion 72 and the rear groove is made small. Further, the reason why the thickness $\underline{b}$ of the partition wall 73 is within a range of 0.5~6.0 mm, preferably 2.0~3.0 mm is based on the fact that the sufficient pressure resistance of the partition wall and the easiness of the subsequent piercing operation are simultaneously established.

After the precure tread 71 is bonded by vulcanization to the base tire 13, the whole or a part of the partition wall 73 is removed by a drill or other piercing means with the opening portion 72 as a mark to properly communicate the rear groove 18 to the opening portion 72, whereby the desired tire is obtained.

Even when heat is generated in the tread during the running of the tire, gases inside the rear groove can be freely discharged to the outside of the tire likewise the aforementioned tire 11, so that the peeling of tread due to the thermal expansion of gas inside the rear groove can be eliminated very effectively to largely improve the tire durability.

Moreover, the removal of the whole or a part of the partition wall 73 can be carried out by the piercing operation before the adhesion of the precure tread 71 to the base tire 13, or by the wearing of tire surface during the running under load after the adhesion to the base tire 13.

Figure 16:
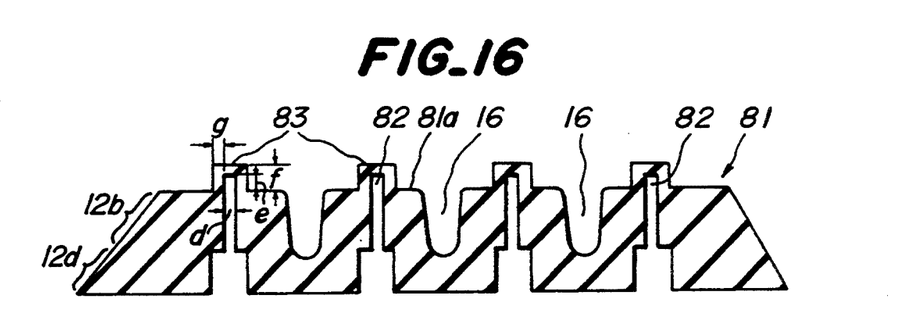
Figures 17A, 17B, 17C, 17D, 17E:
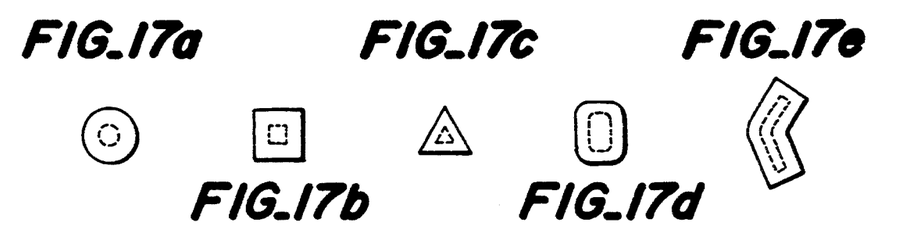
FIGS. 17a-17b and 18a-18b are diagrammatical views illustrating various modifications in the plan and section forms of the protrusion, respectively.

FIG. 16 is a sectional view in widthwise direction of a seventh embodiment of the precure tread according to the invention. In this precure tread 81, at least one rear opening portion 82 is arranged to communicate with the upper end of the rear groove 18, while the end of the rear opening portion 82 is terminated in a protrusion 83 disposed on the tread face 81a.

In the precure tread 81, the diameter $\underline{d}$ of the rear opening portion 82 can be selected within a range of 0.5~4.0 mm, preferably 2.0~3.0 mm in connection with the flowability of gas and the rigidity required in the island portions of the tread. Further, the penetration depth $\underline{e}$ of the rear opening portion 82 into the protrusion 83 is about 0.5 mm when the protrusion 83 can be cut out in the same plane as the tread face in connection with the subsequent cutting accuracy of the protrusion, and is preferably about 1.0 mm. Moreover, the protruding height $\underline{f}$ of the protrusion 83 can be selected within a range of 3.0~10.0 mm in connection with the cutting easiness and the yield of material, while the thickness $\underline{g}$ of sidewall of the protrusion 83 can be selected within a range of 0.5~2.0 mm in connection with the pressure resistance and the yield of material.

Figure 18A:
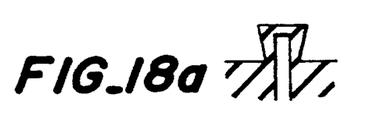
Figure 18B:
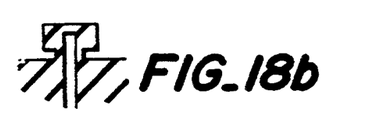

The plan form of the protrusion 83 can properly be selected from forms shown in FIGS. 17a to 17e and other forms, if necessary. On the other hand, the sectional form of the protrusion may take a base portion necked form as shown in FIGS. 18a and 18b for facilitating the subsequent cutting operation.

In case of using the precure tread 81 for the manufacture of tires, the precure tread 81 is first attached to the crown portion 13a of the base tire 13 through the unvulcanized cushion rubber 15a likewise the case of using the precure tread 71. The attached assembly is mounted onto a rim 66 together with the envelop 63 and vulcanized in a vulcanizer by heating from the outside of the envelop 63 under a pressure. After vulcanization, the protrusion 83 protruding from the tread face 81a of the vulcanized assembly is removed by cutting out with a hand cutter or the like.

According to the third method, many protrusions 83 can efficiently be removed by means of the cutter, so that the number of steps required for communicating the rear groove 18 to the atmosphere can considerably be reduced as compared with the aforementioned case of piercing a through-hole in the partition wall 73.

When the time required for cutting out 100 protrusions 83 is compared with the time required for forming the through-holes in 100 partition walls 73, the former case is 5 minutes, while the latter case is 30 minutes.

Even in the resulting tire, the rear groove 18 is communicates to atmosphere during the use, so that the tire durability can largely be improved likewise the use of the precure tread 71.

The removal of the protrusions 83 in the precure tread 81 can be carried out before the adhesion to the base tire 13, or by the wearing during the running of the tire under a load.

Although the invention has been described with reference to the illustrated embodiments, the partition wall 73 in the precure tread 71 may be located the same level as the tread face or a level near thereto. Also the lateral section of the opening portion 72 and the rear opening portion 83 may take sipe-like or other proper form, if necessary.

As mentioned above, according to the invention, the rear groove communicates to atmosphere at least in the use of the tire, so that the peeling of tread due to the thermal expansion of gas inside the rear groove can sufficiently be prevented to largely improve tire durability.

In the first precure tread and the tire using the same, the wet performances can sufficiently be developed even at the last worn stage of tread, and also the wear life can considerably be prolonged. Further, the wear resistance of tread can advantageously be improved by reducing the negative ratio of the surface groove.

In the first method for the manufacture of tires according to the invention, gas inside the rear groove can freely be discharged to the atmosphere, so that the adhesion force between the precure tread and the cushion rubber can be increased and the tire durability can largely be improved.

In the second and third precure treads and the second method for the manufacture of tires using the same, the peeling of tread due to the thermal expansion of gas inside the rear groove can effectively be prevented, and also the rear groove can simply and easily communicate to atmosphere.

What is claimed is:

1. A precure tread strip for a tire to be bonded to a crown portion of a base tire comprising; a ground contacting tread portion and a rear portion located opposite thereto, plural surface openings formed in the ground contacting portion including tread defining grooves, plural rear grooves formed in the rear portion, said rear grooves each aligned with a surface opening, said rear grooves having a volume larger than a volume of an aligned surface opening, and a partition wall in said precure tread strip isolating said rear groove from communication with said ground contact portion.

2. A precure tread strip as in claim 1, wherein said rear groove is a zigzag groove extending in a lengthwise direction of said precure tread strip.

3. A precure tread strip as in claim 1, wherein said rear groove has a tapered sectional shape.

4. A precure tread strip according to claim 1, wherein said plural surface openings comprise a widthwise alternating series of tread defining grooves and narrow opening portions, said rear grooves being aligned with said narrow opening portions.

5. A precure tread for a tire to be bonded to a crown portion of a base tire and having a ground contacting portion and a rear portion located opposite thereto, with plural surface grooves being formed in the ground contacting portion and plural rear grooves being formed in the rear portion, characterized in that a groove bottom of each of said rear grooves is located at a level higher than a groove bottom of each of said surface grooves, and an opening portion extending to the surface of the tread is formed in said precure tread above each of said rear grooves and separated from a corresponding said rear groove through a partition wall.

* * * * *